United States Patent
Wang et al.

(10) Patent No.: US 9,522,848 B2
(45) Date of Patent: Dec. 20, 2016

(54) METHODS FOR PRODUCING A SILICON-CONTAINING ZIRCONIA CALCINED BODY AND A SILICON-CONTAINING ZIRCONIA SINTERED BODY

(71) Applicant: Kaohsiung Medical University, Kaohsiung (TW)

(72) Inventors: Moo-Chin Wang, Kaohsiung (TW); Hsueh-Liang Chu, Kaohsiung (TW); Cheng-Li Wang, Kaohsiung (TW); Horng-Huey Ko, Kaohsiung (TW)

(73) Assignee: KAOHSIUNG MEDICAL UNIVERSITY, Kaohsiung (TW)

( * ) Notice: Subject to any disclaimer, the term of this patent is extended or adjusted under 35 U.S.C. 154(b) by 14 days.

(21) Appl. No.: 14/477,232

(22) Filed: Sep. 4, 2014

(65) Prior Publication Data

US 2016/0068443 A1    Mar. 10, 2016

(51) Int. Cl.
  *C04B 35/48*   (2006.01)
  *C04B 35/626*  (2006.01)
  *C04B 35/634*  (2006.01)

(52) U.S. Cl.
  CPC ......... *C04B 35/481* (2013.01); *C04B 35/6261* (2013.01); *C04B 35/634* (2013.01); *C04B 2235/3201* (2013.01); *C04B 2235/3418* (2013.01); *C04B 2235/442* (2013.01); *C04B 2235/483* (2013.01); *C04B 2235/604* (2013.01);
  (Continued)

(58) Field of Classification Search
  CPC ........ C04B 24/40; C04B 35/01; C04B 35/119; C04B 14/4637; C04B 35/481
  See application file for complete search history.

(56) References Cited

U.S. PATENT DOCUMENTS 4,360,598 A * 11/1982 Otagiri .................. C04B 35/486
                                                         264/658
7,799,267 B2    9/2010 Messing et al.

FOREIGN PATENT DOCUMENTS

CN    1931760 A  *  3/2007  ............. C03C 3/068
CN  101612097 A  * 12/2009
CN  101855187 A    10/2010

OTHER PUBLICATIONS

Translation of CN101612097.*
(Continued)

*Primary Examiner* — Alison L Hindenlang
*Assistant Examiner* — Mohamed K Ahmed Ali
(74) *Attorney, Agent, or Firm* — Muncy, Geissler, Olds & Lowe, P.C.

(57) ABSTRACT

A method for producing a silicon-containing zirconia calcined body includes wet mixing a mixture to obtain a mixed slurry, with the mixture including a silicon-containing zirconia powder, a sodium carbonate powder, a tetraethoxysilane, and an adhesive; drying the mixed slurry to obtain a caked mass; grinding and sieving the caked mass to obtain a mixed powder; pressurizing and shaping the mixed powder to obtain a blank; and calcining the blank in an environment at 900-1200° C. to obtain a silicon-containing zirconia calcined body. The silicon-containing zirconia calcined body can be sintered at 1415-1450° C. into a silicon-containing zirconia sintered body, with a shrinkage ratio during sintering the silicon-containing zirconia calcined body into the silicon-containing zirconia sintered body being 22-31%.

2 Claims, 2 Drawing Sheets

(52) U.S. Cl.
CPC .............. *C04B 2235/6562* (2013.01); *C04B 2235/9615* (2013.01)

(56) References Cited

OTHER PUBLICATIONS

Translation of CN 1931760.*
Zhu, et al., "Synthesis of ZrO2-Mullite Compound Powders in Molten Salt Medium", Rare Metal Materials and Engineering, 2007, pp. 146-149, vol. 36, China.

* cited by examiner

US 9,522,848 B2

METHODS FOR PRODUCING A SILICON-CONTAINING ZIRCONIA CALCINED BODY AND A SILICON-CONTAINING ZIRCONIA SINTERED BODY

BACKGROUND OF THE INVENTION

1. Field of the Invention

The present invention relates to heat treatment methods for silicon-containing zirconia and, more particularly, to methods for producing a silicon-containing zirconia calcined body and a silicon-containing zirconia sintered body.

2. Description of the Related Art

Zirconia ($ZrO_2$) is a ceramic material with properties including high melting and boiling points, high bio-compatibility, high chemical stability, high strength, high hardness, and high toughness. Zirconia has been widely used in different industries including mechanical, electronic, electromechanical, architecture, aerospace, and biomedicine industries.

The most common example of application of zirconia in the biomedicine industry is using a zirconia sintered body as a prosthetic dental material. According to a current industrial technique, a zirconia blank is calcined at a high temperature of 1300-1450° C., and a zirconia calcined body is obtained after cooling. Next, the zirconia calcined body is milled to a desired shape and is heated again at a high temperature of 1300-1450° C., obtaining a zirconia sintered body that can be used as the material for dental prostheses or dental crowns. However, calcination processing and sintering processing at the high temperature consum considerable energy and, thus, result in a high manufacturing cost. The manufacturing cost can be reduced if the temperature of the calcination processing or sintering processing is reduced. Furthermore, in order to adapt to the high temperature processing, the equipment for heat treating zirconia must fulfill special safety regulations and is, thus, expensive, causing a limitation to development in the related industry.

Furthermore, shrinkage ratio of zirconia is not good after calcination, such that the compactness of the zirconia calcined body can not be further increased. Thus, the zirconia calcined body, when used as the prosthetic dental material, could brake due to insufficient structural strength.

SUMMARY OF THE INVENTION

An objective of the present invention is to provide a method for producing a zirconia calcined body, wherein the required calcination temperature can be reduced to achieve an energy-saving effect.

Another objective of the present invention is to provide a method for producing a zirconia sintered body to increase the shrinkage during sintering to thereby increase the compactness after sintering.

The present invention fulfills the above objectives by providing a method for producing a silicon-containing zirconia calcined body including: wet mixing a mixture to obtain a mixed slurry, with the mixture including a silicon-containing zirconia powder, a $Na_2CO_3$ (sodium carbonate) powder, a $Si(OC_2H_5)_4$ (tetraethoxysilane), and an adhesive; drying the mixed slurry to obtain a caked mass; grinding and sieving the caked mass to obtain a mixed powder; pressurizing and shaping the mixed powder to obtain a blank; and calcining the blank in an environment at 900-1200° C. to obtain a silicon-containing zirconia calcined body.

The mixture can include 80-92 wt % of silicon-containing zirconia powder, 5-14 wt % of sodium carbonate powder, 2-5 wt % of tetraethoxysilane, and 0.1-1 wt % of adhesive.

The mixed slurry can be obtained by uniformly mixing the mixture and a liquid by a wet ball milling process.

In a first example, wet mixing the mixture to obtain the mixed slurry includes: adding 15.00 g of silicon-containing zirconia powder containing 3 mol % of silicon, 0.79 g of sodium carbonate powder, 0.28 g of tetraethoxysilane, and 0.15 g of $(C_2H_4O)_x$ (polyvinyl alcohol) into 100 ml of deionized water and obtaining the mixture after uniform mixing; placing the mixture into a ball mill pot and adding a plurality of grinding balls and ethanol into the ball mill pot; and mixing by ball milling to obtain the mixed slurry.

In a second example, wet mixing the mixture to obtain the mixed slurry includes: adding 15.00 g of silicon-containing zirconia powder containing 5 mol % of silicon, 1.32 g of sodium carbonate powder, 0.48 g of tetraethoxysilane, and 0.15 g of polyvinyl alcohol into 100 ml of deionized water and obtaining the mixture after uniform mixing; placing the mixture into a ball mill pot and adding a plurality of grinding balls and ethanol into the ball mill pot; and mixing by ball milling to obtain the mixed slurry.

In a third example, wet mixing the mixture to obtain the mixed slurry includes: adding 15.00 g of silicon-containing zirconia powder containing 7 mol % of silicon, 1.85 g of sodium carbonate powder, 0.69 g of tetraethoxysilane, and 0.15 g of polyvinyl alcohol into 100 ml of deionized water and obtaining the mixture after uniform mixing; placing the mixture into a ball mill pot and adding a plurality of grinding balls and ethanol into the ball mill pot; and mixing by ball milling to obtain the mixed slurry.

In a fourth example, wet mixing the mixture to obtain the mixed slurry includes: adding 15.00 g of silicon-containing zirconia powder containing 10 mol % of silicon, 2.65 g of sodium carbonate powder, 1.02 g of tetraethoxysilane, and 0.15 g of polyvinyl alcohol into 100 ml of deionized water and obtaining the mixture after uniform mixing; placing the mixture into a ball mill pot and adding a plurality of grinding balls and ethanol into the ball mill pot; and mixing by ball milling to obtain the mixed slurry.

In each example, when grinding and sieving the caked mass to obtain the mixed powder, a weight ratio of a total weight of the plurality of grinding balls to a weight of the mixture is 4:13.

The blank can be obtained by placing the mixed powder into a mold and applying a pressure of 75-130 MPa to the mixed powder.

Calcining the blank can include heating the blank to 900-1200° C. at a temperature increasing rate of 10° C./min, maintaining the temperature for 1-4 hours, and cooling the blank to obtain the silicon-containing zirconia calcined body.

The present invention also provides a method for producing a silicon-containing zirconia sintered body including: wet mixing a mixture to obtain a mixed slurry, with the mixture including a silicon-containing zirconia powder, a sodium carbonate powder, a tetraethoxysilane solution, and an adhesive; drying the mixed slurry to obtain a caked mass, with the caked mass formed by bonding the silicon-containing zirconia powder and the sodium carbonate powder with the adhesive; grinding and sieving the caked mass to obtain a mixed powder; pressurizing and shaping the mixed powder to obtain a blank; calcining the blank in an environment at 900-1200° C. to obtain a silicon-containing zirconia calcined body; and sintering the silicon-containing zirconia calcined body at 1415-1450° C. into a silicon-containing zirconia sintered body, with a shrinkage during sintering the silicon-containing zirconia calcined body into the silicon-containing zirconia sintered body being 22-31%.

Sintering the silicon-containing zirconia calcined body can include heating the silicon-containing zirconia calcined body to 900° C. at a temperature increasing rate of 10° C./min; heating the silicon-containing zirconia calcined body to 1415-1450° C. at a temperature increasing rate of 5° C./min; and maintaining the temperature for 0.5-1 hour to obtain the silicon-containing zirconia sintered body.

The method for producing a zirconia calcined body according to the present invention can effectively reduce the required calcination temperature to reduce the costs for manufacturing and equipment. Furthermore, the method for producing a zirconia sintered body according to the present invention can effectively increase the shrinkage of the silicon-containing zirconia sintered body to increase the compactness of the sintered body, effectively avoiding breakage.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

Figure 1A:
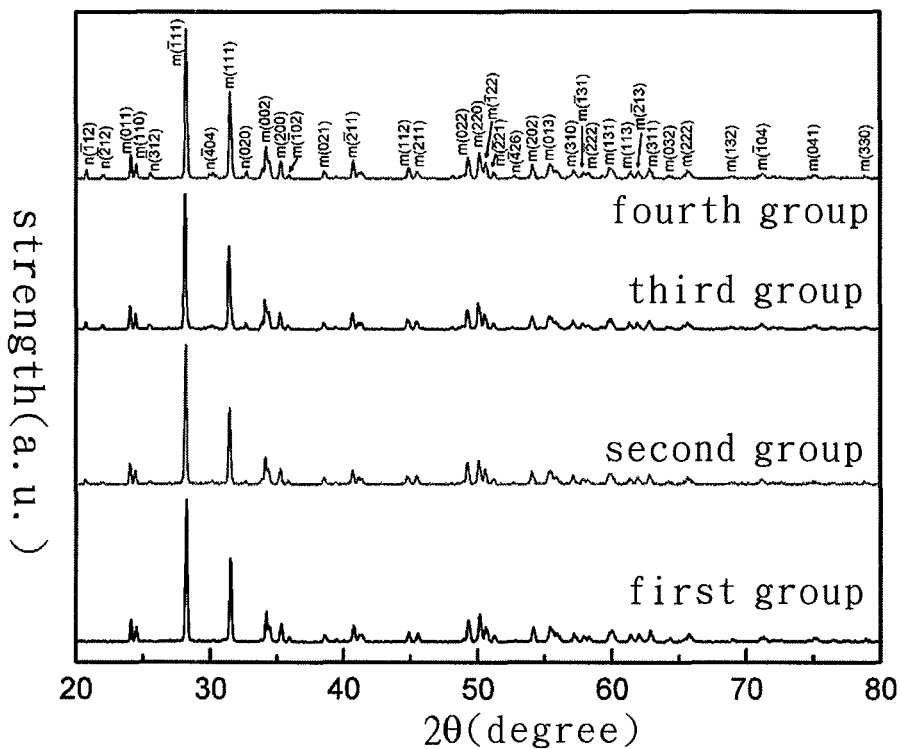
FIG. 1a is an X-ray diffraction diagram of silicon-containing zirconia sintered bodies obtained from four example groups at 1380° C.

In an embodiment according to the present invention, a method for producing a silicon-containing zirconia calcined body includes wet mixing a mixture to obtain a mixed slurry. The mixture includes a silicon-containing zirconia powder, a sodium carbonate powder, a tetraethoxysilane, and an adhesive. Specifically, the mixed slurry is obtained by uniformly mixing the mixture and a liquid by a wet ball milling process. Furthermore, the mixture includes 80-92 wt % of silicon-containing zirconia powder, 5-14 wt % of sodium carbonate powder, 2-5 wt % of tetraethoxysilane, and 0.1-1 wt % of adhesive. The percentage of each component can be adjusted according to needs, which can be appreciated by one having ordinary skill in the art. The adhesive can be, but not limited to, polyvinyl alcohol.

Then, the mixed slurry is dried to obtain a caked mass. The caked mass is formed by bonding the silicon-containing zirconia powder and the sodium carbonate powder with the adhesive. Specifically, during drying, the mixed slurry is exposed to high temperature to completely evaporate the liquid in the mixed slurry to thereby obtain the caked mass. The adhesive in the mixed slurry can bond the silicon-containing zirconia powder and the sodium carbonate powder after drying the mixed slurry, together forming the caked mass.

Next, the caked mass is grinded and sieved to obtain a mixed powder. Grinding and sieving are common knowledge in the art and are, thus, not set forth to avoid redundancy.

Then, the mixed powder is pressurized and shaped to obtain a blank. As an example, the mixed powder is placed in a mold, and a pressure of 75-130 MPa is applied to the mixed powder to pressurize and shape the mixed powder to obtain the blank.

Next, the blank is calcined in an environment at 900-1200° C. to obtain a silicon-containing zirconia calcined body. Specifically, calcining the blank includes heating the blank to 900-1200° C. at a temperature increasing rate of 10° C./min, maintaining the temperature for 1-4 hours, and cooling the blank to obtain the silicon-containing zirconia calcined body. Sodium carbonate decomposes into carbon dioxide and sodium oxide at high temperature. Sodium oxide reacts with silicon-containing zirconia to form $Na_2ZrSiO_5$ crystalline phase in the silicon-containing zirconia calcined body. Due to existence of the hetero phase crystalline of $Na_2ZrSiO_5$, a low calcining temperature of 900-1200° C. is sufficient to produce the silicon-containing zirconia calcined body.

In another embodiment according to the present invention, a method for producing a silicon-containing zirconia sintered body includes sintering the silicon-containing zirconia calcined body obtained from the above embodiment at a sintering temperature of 1415-1450° C. into a silicon-containing zirconia sintered body. A shrinkage during sintering the silicon-containing zirconia calcined body into the silicon-containing zirconia sintered body is 22-31%. In an example, sintering the silicon-containing zirconia calcined body includes heating the silicon-containing zirconia calcined body to 900° C. at a temperature increasing rate of 10° C./min, heating the silicon-containing zirconia calcined body to 1415-1450° C. at a temperature increasing rate of 5° C./min, and maintaining the temperature for 0.5-1 hour to obtain the silicon-containing zirconia sintered body.

Note that if it is desired to use the silicon-containing zirconia sintered body as a prosthetic dental material, the silicon-containing zirconia calcined body obtained from the above embodiment can firstly be milled to obtain an outline of the resultant product according to different uses (such as a dental bridge, dental crown, coping, or other equivalents) before conducting the sintering step. Milling can be achieved by using any approach in the art, such as milling the silicon-containing zirconia calcined body with a digital tooth-carving CAD/CAM technique.

The present invention will be further described by the following example groups.

(1) First Group 15.00 g of silicon-containing zirconia powder containing 3 mol % of silicon, 0.79 g of sodium carbonate powder, 0.28 g of tetraethoxysilane, and 0.15 g of polyvinyl alcohol were added into 100 ml of deionized water to obtain a mixture after uniform mixing. The mixture was placed into a ball mill pot. Grinding balls with an appropriate weight based on the weight of the mixture were added into the ball mill pot. The weight ratio of the total weight of the grinding balls to the weight of the mixture is 4:13. The grinding balls includes grinding balls having a diameter of 15 mm and grinding balls having a diameter of 10 mm. Furthermore, ethanol of an appropriate weight was added into the ball mill pot, and a mixed slurry was obtained by ball milling the mixture, the grinding balls, and ethanol for about 24 hours.

Then, the grinding balls were filtered, and the mixed slurry in the ball mill pot was poured into a beaker. The mixed slurry was dried in an oven at 100° C. to evaporate all of the liquid in the mixed slurry, leaving a caked mass in the beaker. The silicon-containing zirconia powder and the sodium carbonate powder were bonded to each other by polyvinyl alcohol.

Next, the caked mass was removed from the beaker and was grinded and then sieved to obtain a mixed powder. The mixed powder was placed in a mold, and a hydraulic press was used to apply a pressure of 75-130 MPa to pressurize and shape the mixed powder in the mold, obtaining a blank.

Next, after placing the blank into a high temperature furnace, the blank was heated to 900-1200° C. at a temperature increasing rate of 10° C./min, and the blank was maintained at the temperature for 1-4 hours and then cooled to obtain a silicon-containing zirconia calcined body.

Finally, if it is desired to sinter the silicon-containing zirconia calcined body into a silicon-containing zirconia sintered body, an optional milling process could be carried out on the silicon-containing zirconia calcined body if desired, and the silicon-containing zirconia calcined body was then placed in a high temperature furnace. The silicon-containing zirconia calcined body was heated to 900° C. at a temperature increasing rate of 10° C./min. Next, the silicon-containing zirconia calcined body was heated to 1415-1450° C. at a temperature increasing rate of 5° C./min, and the temperature was maintained for 0.5-1 hour to obtain a silicon-containing zirconia sintered body.

(2) Second Group 15.00 g of silicon-containing zirconia powder containing 5 mol % of silicon, 1.32 g of sodium carbonate powder, 0.48 g of tetraethoxysilane, and 0.15 g of polyvinyl alcohol were added into 100 ml of deionized water to obtain a mixture after uniform mixing. The remaining procedures were the same as those of the first group.

(3) Third Group 15.00 g of silicon-containing zirconia powder containing 7 mol % of silicon, 1.85 g of sodium carbonate powder, 0.69 g of tetraethoxysilane, and 0.15 g of polyvinyl alcohol were added into 100 ml of deionized water to obtain a mixture after uniform mixing. The remaining procedures were the same as those of the first group.

(4) Fourth Group 15.00 g of silicon-containing zirconia powder containing 10 mol % of silicon, 2.65 g of sodium carbonate powder, 1.02 g of tetraethoxysilane, and 0.15 g of polyvinyl alcohol were added into 100 ml of deionized water to obtain a mixture after uniform mixing. The remaining procedures were the same as those of the first group.

Figure 1B:
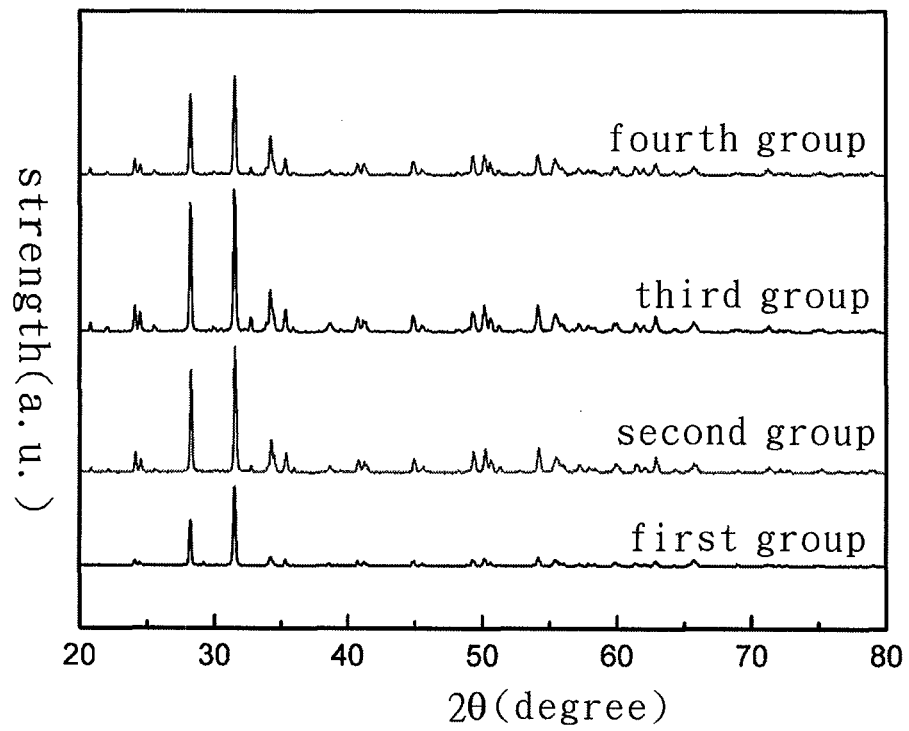
FIG. 1b is an X-ray diffraction diagram of silicon-containing zirconia sintered bodies obtained from four example groups at 1440° C.

X-ray diffraction analysis method was used to analyze the silicon-containing zirconia sintered bodies obtained from the first, second, third, and fourth groups. As can be seen from FIGS. 1a and 1b, all of the silicon-containing zirconia sintered bodies obtained from the first, second, third, and fourth groups included monoclinic zirconia (represented by "m" in FIG. 1a) and a small amount of $Na_2ZrSiO_5$ crystalline phase (represented by "n" in FIG. 1a).

Figure 2:
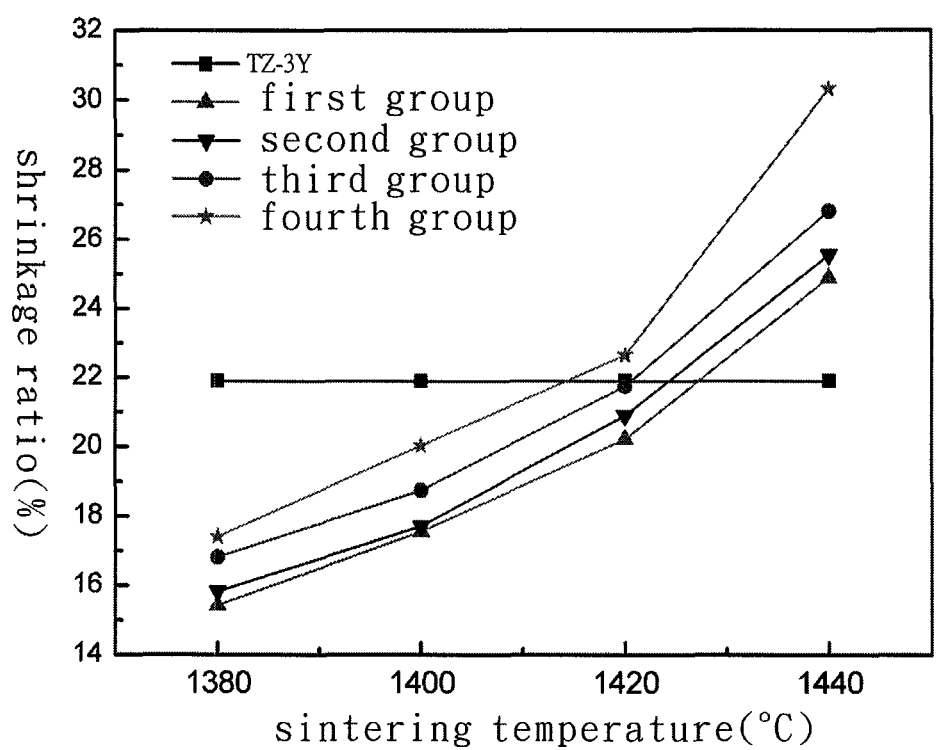
FIG. 2 is a diagram showing shrinkages of the silicon-containing zirconia sintered bodies obtained from four example groups and TZ-3Y available in the market.

FIG. 2 shows the shrinkage ratios of the silicon-containing zirconia sintered bodies obtained from the first, second, third, and fourth groups and TZ-3Y available in the market. The "shrinkage ratio" is obtained from the volume difference between the volume of the silicon-containing zirconia sintered body and the volume of the silicon-containing zirconia calcined body, as divided by the volume of the silicon-containing zirconia calcined body and then multiplied by 100%. The volume was measured by a caliper. As can be seen from FIG. 2, the shrinkage ratio of the silicon-containing zirconia sintered bodies obtained from the first, second, third, and fourth groups changed significantly in response to the sintering temperature. The shrinkage ratios of the silicon-containing zirconia sintered bodies obtained at the sintering temperature of 1415-1450° C. were superior to those of TZ-3Y. Thus, the compactness of the silicon-containing zirconia sintered bodies were increased, increasing the structural strengths of the silicon-containing zirconia sintered bodies and, hence, avoiding breakage when used as a prosthetic dental material.

In view of the foregoing, the method for producing a zirconia calcined body according to the present invention can effectively reduce the required calcining temperature and can significantly reduce the energy consumed, reducing the manufacturing cost. Furthermore, the equipment cost for carrying out the procedures can be significantly reduced by lowering the working temperature during calcintion, which is advantageous to development of the industry.

The method for producing a zirconia sintered body according to the present invention can effectively increase the shrinkage ratio of the silicon-containing zirconia sintered body and, hence, increase the compactness. The silicon-containing zirconia sintered body produced has a better structural strength, which can effectively avoid breakage when used as a prosthetic dental material.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for producing a silicon-containing zirconia sintered body with a monoclinic phase comprising:
   wet mixing a mixture to obtain a mixed slurry, with the mixture including a silicon-containing zirconia powder, a sodium carbonate powder, a tetraethoxysilane solution, and an adhesive; drying the mixed slurry to obtain a caked mass, with the caked mass formed by bonding the silicon-containing zirconia powder and the sodium carbonate powder with the adhesive;
   grinding and sieving the caked mass to obtain a mixed powder; pressurizing and shaping the mixed powder to obtain a blank; calcining the blank in an environment at 900-1200° C. to obtain a silicon-containing zirconia calcined body; and sintering the silicon-containing zirconia calcined body at 1415-1450° C. into a silicon-containing zirconia sintered body, with a shrinkage ratio during sintering the silicon-containing zirconia calcined body into the silicon-containing zirconia sintered body being 22-31%.

2. The method for producing a silicon-containing zirconia sintered body with a monoclinic phase as claimed in claim 1, with sintering the silicon-containing zirconia calcined body including heating the silicon-containing zirconia calcined body to 900° C. at a temperature increasing rate of 10° C./min; heating the silicon-containing zirconia calcined body to 1415-1450° C. at a temperature increasing rate of 5° C./min; and maintaining the temperature for 0.5-1 hour to obtain the silicon-containing zirconia sintered body.

* * * * *